Dec. 14, 1954
R. T. CLOUD
2,696,676
APPARATUS FOR PENDULUM COMPENSATION AGAINST
ACCELERATION INDUCED COMPONENTS OF FORCE
Filed June 27, 1950
2 Sheets-Sheet 1
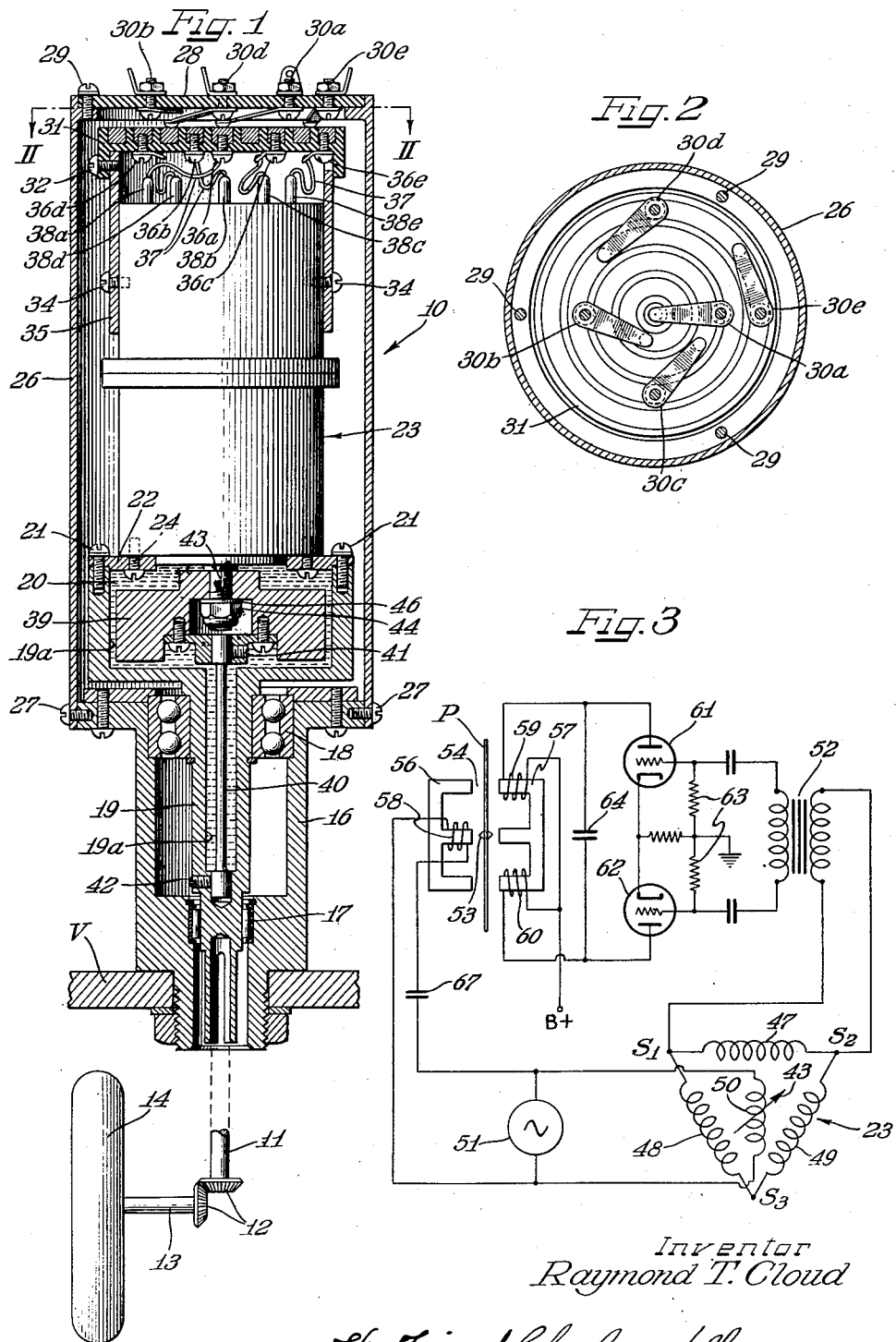
Inventor
Raymond T. Cloud
by The Firm of Charles W. Hills
Attys Dec. 14, 1954    R. T. CLOUD    2,696,676
APPARATUS FOR PENDULUM COMPENSATION AGAINST
ACCELERATION INDUCED COMPONENTS OF FORCE
Filed June 27, 1950    2 Sheets-Sheet 2
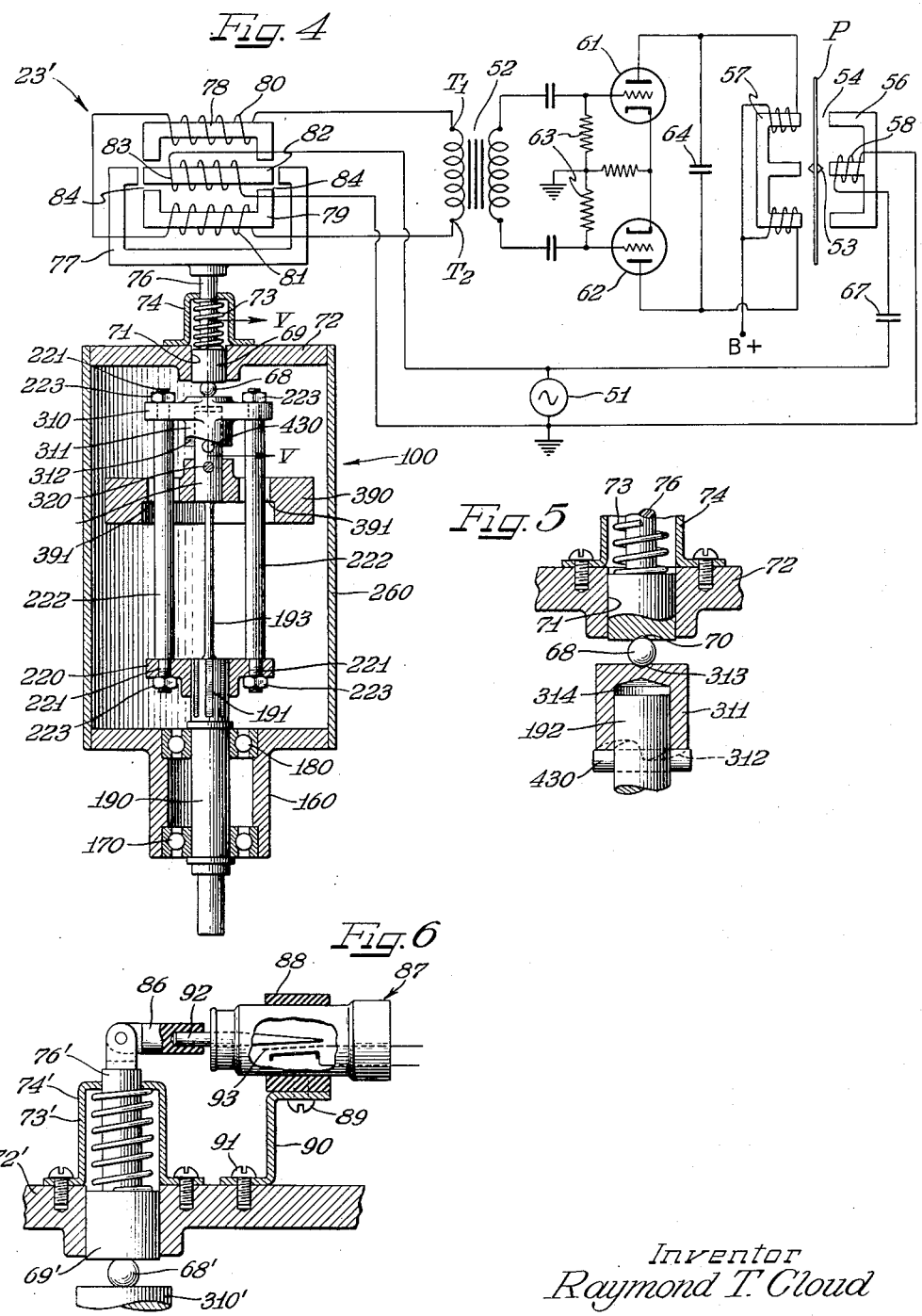
Inventor
Raymond T. Cloud
by The Firm of Charles W. Hills    Attys

United States Patent Office 2,696,676
Patented Dec. 14, 1954

2,696,676

APPARATUS FOR PENDULUM COMPENSATION AGAINST ACCELERATION INDUCED COMPONENTS OF FORCE

Raymond T. Cloud, Houston, Tex., assignor to North American Geophysical Co., Houston, Tex., a corporation of Texas Application June 27, 1950, Serial No. 170,581

11 Claims. (Cl. 33—220)

This invention relates generally to improvements in geophysical instruments and more particularly to a novel improved apparatus for pendulum compensation through a mechanical torsion arrangement whereby a displacement proportional to an acceleration force component may be produced and measured by a transducer assembly to convert the displacement into an appropriate electric signal, in response to which, the pendulously supported disk-type pendulum of a geophysical exploration instrument may be compensated against the acceleration induced components of force to which said pendulum may be subjected when it is carried on a movable vehicle.

It is well known that acceleration is normally considered as one of the vector quantities in the realm of physics which is most easily analyzed when resolved into components of time and velocity, the definition of acceleration under such an analysis being considered as the rate of change of velocity with respect to a selected unit of time.

Heretofore, artisans in the design of geophysical instruments constructed for use in making geophysical surveys have depended upon the above-mentioned characteristics of acceleration in providing compensating mechanisms for applying a counterbalancing force to a vehicle carried pendulum in opposition to the acceleration induced force components set up by virtue of the linear movement of the vehicle.

In this connection, apparatus was sometimes provided which utilized a D. C. generator as an accelerometer, a current being generated which was proportional to the acceleration of the vehicle and such current being introduced into a modulator circuit after which a resultant signal could be amplified and converted into a suitable counterbalancing force to be applied to the pendulum.

One such arrangement is shown in my copending application U. S. Serial No. 18,775, filed April 3, 1948, now Patent 2,665,499, in which at least a pair of coils are mounted independently of the pendulum but in inductive relationship to a metallic portion of the pendulum so that a flux penetration of the metallic portion of the pendulum may be produced as a function of vehicle acceleration to produce a torque on the pendulum exactly equal and opposite to the acceleration induced torque thereon.

In my Patent No. 2,362,616 issued November 14, 1944, I disclose an apparatus in which a torque proportional to the acceleration induced component of force was applied directly to the pendulum, the torque being generated by running a current proportional to the acceleration of the vehicle through a coil attached to the pendulum and surrounded by a magnetic field established by a suitable magnet.

Wherever a D. C. generator is employed, however, the inherent provision of commutator bars results in the generation of a ripple current which is essentially alternating in character and which varies according to the rotative velocity of the generator as well as the condition of the brushes and the width of the brushes.

Moreover, since the D. C. generator is of necessity mounted on the vehicle carrying the pendulum, the vibration to which the generator is exposed causes the commutator bars to generate random noises which are sometimes referred to among those versed in the art as "hash." It will readily be understood that the adverse effects of "hash" will increase as wear of the commutator bars occurs and as roughness thereof gets progressively worse.

In attempting to overcome the deficiencies of a D. C. generator, those versed in the art have suggested the use of various types of structures adapted to filter out the alternating current interferences so as to employ just the direct current produced by the generator. The use of filters, however, is frowned upon because a time delay is introduced into the operation of the apparatus, thereby introducing error in compensating the pendulum. The use of derivative taking devices has also been suggested, however, a true derivative of the current cannot be obtained since the final result is only an approximation. The condensers employed are also imperfect and result in a soaking up effect sometimes referred to as a remanant charge which may last as long as several minutes and which will introduce considerale error into the electrical circuits associated with the pendulum compensation structure. Condenser discharge also occurs with the result that extremely small voltages almost similar to the desired D. C. current are produced, hence, ordinary amplification cannot be used. Under such conditions, a supplementary "chopper" circuit must be employed which in many instances will also produce a "hash" effect quite similar to the D. C. signal which must be isolated.

Although in quantitative value the electrical errors introduced by such deficiencies are quite small, they are, nevertheless, of serious consequence in a geophysical instrument. In geophysical surveying work it is highly desirable that a pendulum be employed which is sensitive to as little as five seconds of arc, such a pendulum actually being employed to measurably detect a slope of one inch to the mile. A surveying circuit over a closed course and of approximately twenty miles length should result in a misclosure of substantially less than one foot of total elevation.

According to the general features of the present invention, an acceleration component is generated mechanically without the use of a D. C. generator.

Sir Isaac Newton is accredited with making the original observation that an acceleration is always accompanied by a force in accordance with Newton's Law which holds that the acceleration in any particle produced by a particular "unbalanced" force applied to that particle is directly proportional to the magnitude of the "unbalanced" force and inversely proportional to the mass of the particle. Under such an analysis, the definition of acceleration is considered as the proportion of unbalanced force over mass, where such force and the acceleration are acting in the same general direction.

The subject matter of the present invention exploits the fixed relationship that exists between acceleration and the unbalanced forces which are necessarily related thereto. An apparatus is employed which includes a mechanical torsion arrangement whereby a relative angular displacement proportional to an acceleration force component may be produced with the aid of an inertia wheel or some similar structure which may be subjected to an unbalanced torque proportional to an acceleration component of a linearly movable vehicle. The angular displacement is either converted into a linear movement of translation or is directly measured by a transducer assembly. In either event, an appropriate electric signal proportional to the relative displacement and hence proportional to the acceleration force component is used to apply a counterbalancing force to the pendulum in opposition to the acceleration induced components of force in the vehicle.

It is an object of the present invention, therefore, to provide apparatus for pendulum compensation against the acceleration induced components of force which overcomes the deficiencies of the prior art and the other structures heretofore provided.

Another object of the present invention is to provide an improved apparatus for determining the quantitative value of the linear acceleration induced components of force in a vehicle movable along a linear path which is essentially mechanical in nature.

It is yet another object of the present invention to provide an apparatus for compensating a pendulously mounted object carried in a vehicle movable on a linear path against acceleration induced components of force which is motivated by a mechanically generated signal proportional to the acceleration induced components of force in the vehicle.

Many other advantages, features and additional objects of the present invention will become manifest to those versed in the art upon making reference to the detailed description which follows and the accompanying sheets of drawings, in which a preferred embodiment of several types of apparatus capable of practicing the invention is shown.

On the drawings:

Figure 1 is a partly schematic cross sectional view with parts in elevation showing a rotational transducer provided in accordance with the present invention;

Figure 2 is a fragmentary cross sectional view taken on line II—II of Fig. 1;

Figure 3 is a circuit diagram showing how the structure of the rotational transducer of Figs. 1 and 2 is employed in the practice of the teachings of the present invention;

Figure 4 is an alternative embodiment of a rotational transducer including a fragmentary cross sectional view with parts in elevation of a transducer and a circuit diagram of the electrical components associated with such transducer;

Figure 5 is an enlarged cross sectional fragmentary view of a motion translation connection employed in the apparatus of Fig. 4 taken on line V—V; and Figure 6 is an enlarged fragmentary cross section view with parts in elevation and with parts broken away to show additional details of construction showing an alternative embodiment of a mechano-electronic transducer provided in accordance with the present invention.

As shown on the drawings:

Although the principles of the present invention are of general utility, it may be noted that such principles will be described with particular reference to an apparatus for pendulum compensation against acceleration induced components of force, the pendulum being referred to in various parts of this disclosure as a pendulously mounted disk-type pendulum P carried in a mobile vehicle indicated by the reference character V which is adapted to be used in conducting geophysical surveys and hence will be normally driven over irregular terrain generally in a linear direction.

As shown on Figure 1, the vehicle V mounts a rotational transducer which is indicated generally by the reference numeral 10 and which is mechanically connected to a driving means so that the linear movement of the vehicle V will be translated into a proportional angular movement of certain rotatable elements within the transducer 10. In the particular embodiment of Figure 1, a shaft 11 is connected through bevel gears 12 to an axle 13 rotated by a fifth wheel 14 adapted to engage the ground and thereby partake of the same linear movement as the vehicle V.

The rotational transducer 10 includes a frame 16 suitably counterbored to seat a lower bearing means 17 and an upper bearing means 18 in which a drive shaft 19 may be rotatably journaled.

In the embodiment of Figure 1, the drive shaft in cross section appears to be generally T-shaped having a hollow bore throughout a substantial portion thereof indicated by the reference character 19a which is filled with a damping fluid 20, the purpose of which will become manifest presently.

A plurality of suitable fasteners 21 are used to place a cover 22 in firm assembly with the drive shaft 19, the cover 22 serving the further function of supporting a mechano-electrical transducer indicated generally by the reference numeral 23, additional fasteners 24 being passed through the cover 22 to secure the mechano-electrical transducer 23 in firm assembly with the cover 22.

A generally cylindrical casing 26 is mounted on the frame 16 and secured thereto by a plurality of fasteners 27 so as to substantially encase the mechano-electrical transducer 23 and the upper portion of the drive shaft 19, thereby to reduce the effects of windage losses and other interferences which would preclude free rotation of the drive shaft 19 and the mechano-electrical transducer 23.

The casing 26 has a cover 28 secured in the top portion thereof by a plurality of fasteners 29, the cover 28 carrying a plurality of male contact elements indicated generally by the reference numeral 30a, 30b, 30c, 30d and 30e cooperable with an appropriately grooved slip ring plate 31 firmly connected by a fastener 32 to a cylinder 33 telescoped over the upper end of the mechano-electrical transducer 23 and firmly retained thereon by a plurality of fasteners 34. The grooved slip ring plate is provided with contacts 36a, 36b, 36c, 36d, 36e and conductor wires 37 are provided between each of said contacts and a corresponding plurality of contacts 38a, 38b, 38c, 38d, and 38e associated with the mechano-electrical transducer 23.

An inertia wheel 39 is supported for rotation within the hollow bore of the drive shaft 19 by a separate driving connection which in this embodiment takes the form of a shaft 40 of reduced cross sectional area so as to be somewhat flexible in torsion. The torsion responsive shaft 40 is locked to the inertia wheel by a set screw 41 and is connected to the drive shaft 19 for corotation therewith by a set screw 42.

The inertia wheel 39 together with the shaft 40 is completely surrounded by the damping fluid 20 filling the bore 19a of the drive shaft 19 to dampen and thereby stabilize the operation of the rotational transducer 10.

A shaft 43 extends outwardly of the lower portion of the mechano-electrical transducer 23 and is threaded on the end portion to receive a nut 44 and a lock washer 46, the shaft 43 passing through a suitable aperture formed in the inertia wheel 39 so that the nut 44 may be drawn up tightly to place the inertia wheel 39 in firm assembly with the shaft 43.

According to the laws of physics, the opposition which a particular particle offers to any change in motion due to unbalanced force acting thereon to produce an acceleration is known as "inertia." According to the principles of the present invention, advantage is taken of the fixed relationship that exists between acceleration and the unbalanced forces which are necessarily related thereto. Particular advantage is taken of the so-called second law of angular motion, namely, that a body subjected to an unbalanced torque will be accelerated angularly, the acceleration being proportional to the torque and inversely proportional to the moment of inertia of the body about its axis of rotation.

In the operation of the rotational transducer 10 shown in Figure 1, the linear movement of the vehicle is translated into a proportional angular movement of the rotatable drive shaft 19 which, in turn, rotates the inertia wheel 39 having a comparatively high moment of inertia through the torsion sensitive length or shaft 40. Therefore, the same unbalanced torque will be delivered to the inertia wheel 39 as to the drive shaft 19, however, due to the inertia characteristics of the inertia wheel 39 a relative angular displacement will occur which will be proportional to the quantitative value of the component of linear acceleration of the vehicle V.

The electro-mechanical transducer 23 of Figure 1 is shown schematically in the circuit diagram of Figure 3 as comprising an adaption of a self-synchronous alternator or selsyn unit. Conventionally, a selsyn unit includes a stator including stator coils 47, 48 and 49 spaced 120° apart from one another and having the ends of each coil interconnected to terminals $S_1$, $S_2$ and $S_3$.

The rotor of the selsyn unit includes a coil 50 which is turned by the shaft 43 shown in Figure 1 and represented in the circuit diagram of Figure 3 as an arrow through the coil 50.

It will be understood that in a conventional selsyn unit the stator remains relatively stationary and the rotor is angularly displaced relative thereto, however, in the present embodiment, the stator of the selsyn unit rotates with the drive shaft 19 and the coil 50 is intimately related to the inertia wheel 39 through the shaft 43. Since the entire unit rotates, the relative angular displacement between the rotor coil 50 and the stator coils 47, 48 and 49 is electrically transmitted through the slip ring arrangement between the casing 26 and the electro-mechanical transducer 23 including the slip ring plate 31 and the male contacts 30a, 30b, 30c, 30d, and 30e.

An alternating current is supplied to the rotor coil 50 of the selsyn unit by a generator 51 and whenever a relative displacement occurs between the rotor coil 50 and the stator coils 47, 48 and 49, the stator coils will be subjected to an alternating magnetic flux which induces voltages in the coils by means of a transformer action, the result of which is the production of an electric signal which may be delivered by suitable conductors to an output transformer 52.

It will be understood that the quantitative value of the signal produced by the electro-mechanical transducer is actually a measure of the quantitative value of the component of linear acceleration since the difference in relative angular displacement between the rotor and the stator of the selsyn unit will be directly dependent upon the relative angular displacement between the inertia wheel 39 and the drive shaft 19 which, in turn, is directly proportional to the component of linear acceleration of the vehicle V.

Accordingly, according to the principles of the present invention, the signal thus produced may be exploited by applying a counterbalancing force to the pendulously mounted disk pendulum P carried by the vehicle V in opposition to the acceleration induced components of force in response to variations in quantitative value of the said signal.

Although not limited thereto, a typical apparatus provided for accomplishing this end is shown in the remaining part of the circuit diagram of Figure 3.

The pendulum P may comprise a disk-like member of electrically conducting material having pivot mounting 53 at its center for freely suspending the pendulum in a suitable pair of bearings carried by the vehicle V. The pendulum disk is suitably weighted to impart pendulum characteristics thereto and a portion of the periphery of the pendulum P passes through an air gap 54 formed between a pair of identical magnetic structures 56 and 57 which are preferably supported independently of the pendulum P.

A biasing flux coil 58 is provided for the magnetic member 56 and a pair of control flux coils 59 and 60 are provided for the magnetic member 57 so that a resultant control flux produced by the windings 59 and 60 in out-of-phase relationship with respect to the biasing flux produced by the winding 58 will result in the exertion of a torque on the pendulum P through the reaction of the eddy current generated in the pendulum P.

The control coils 59 and 60 are energized in parallel through a conventional push-pull amplifying circuit, one end of the coils 59 and 60 being connected to a B+ terminal and the other end being connected respectively to the plate of a first amplifying tube 61 and a second amplifying tube 62. The grids of the amplifier tubes 61 and 62 are energized in parallel through the output transformer 52 which has its primary connected across terminals S₁ and S₂ of the selsyn unit and its secondary connected to the grid. The cathodes of the amplifier tubes 61 and 62 are grounded and the usual grid resistors 63 are connected between each of the grids of the tubes 61 and 62 and the cathodes thereof.

A condenser 64 is shown connected across the plate of the amplifier tubes 61 and 62 and is suitably proportioned so as to properly tune the output circuit of the amplifier tubes 61 and 62.

The counterbalancing force applied to the pendulum P in opposition to the acceleration induced components of force is produced in a well known manner through the operation of the circuit components thus far described. A signal voltage will appear across the terminals S₁ and S₂ whenever an acceleration occurs so that, depending upon the phase of the signal voltage, the effective grid bias on one of the tubes 61 or 62 over the conducting half of its cycle will be increased while the effective grid bias of the other tube over the conducting portion of its cycle will be decreased.

A resultant control flux is produced by the windings 59 and 60.

The biasing coil 58 being energized from the alternating current generator 51 through a series connected condenser 67 will have current flowing through the biasing coil 58 approximately 90° out of phase with respect to the current flowing in either of the coils 59 and 60, hence, a torque will be exerted on the pendulum P through the reaction of the eddy current generated in the conducting disk.

For further details in respect to the provision of apparatus for effecting the actual compensation of the pendulum, reference may be had to my copending application U. S. Serial No. 18,775, filed April 3, 1948.

In Figure 4 an alternative embodiment is shown wherein the linear movement of the vehicle may again be translated into a proportional angular movement of a rotatable driving means so that acceleration of the vehicle will result in a relative angular displacement between two of the rotatable elements, one of the rotatable elements connected to the driving means having a greater moment of inertia than the other. However, according to the structural embodiments shown in Figure 4, the relative angular displacement is again translated by a motion converting mechanism into a linear movement and the linear movement, in turn, is measured electrically to produce a signal in response to which a counterbalancing force may be applied to the pendulously mounted disk pendulum in opposition to the acceleration induced components of force in the vehicle.

In Figure 4, a rotational transducer indicated generally by the reference numeral 100 includes a frame 160 which supports a pair of spaced bearings 170 and 180 adapted to rotatably journal a drive shaft 190 which, as in the case of the drive shaft 19 in the structural embodiment of Figure 1, may be angularly displaced proportionally to the linear movement of a vehicle upon which the transducer 100 is mounted.

The drive shaft 190 is provided with a splined area 191 to rotatably drive a disk 220 having an aperture therethrough formed with suitable mating means so as to be slidable along the length of the drive shaft 190 at the locale of the splined area 191 during co-rotation therewith. The disk is provided with a plurality of radially spaced apertures which pass a corresponding plurality of bolts 221 each of which is surrounded by a spacer sleeve 222. A camming member 310 is supported on the ends of the spacer sleeve 222 and a plurality of nuts 223 may be turned onto each end of the bolts 221 to place the camming disk 310, the spacer sleeve 222 and the disk 220 in rigid and firm assembly with one another.

It will be noted that the camming disk 310 is provided with a hub 311 having a camming surface 312 on the under portion thereof and a ball seating dimple 313 on an upper portion thereof as well as a recessed bore 314 which rotatably journals a bearing portion 192 comprising a continuation of the drive shaft 190.

Immediately adjacent the splined area 191 of the drive shaft 190 is formed a reduced diameter portion comprising a somewhat flexible torsion-responsive shaft 193, the length of the torsion-responsive shaft 193 being of predetermined selection with the bearing portion 192 comprising a relatively enlarged diameter portion on the end thereof.

A camming pin 430 is extended through the bearing portion 192 of the drive shaft 190 and is placed in firm assembly therewith for camming engagement with the cam surface 312 formed on the hub 311.

An inertia wheel 390 comprising a generally cylindrical mass having a comparatively large moment of inertia is firmly attached to the bearing portion 192 of the drive shaft 190 by a fastener pin 320. The inertia wheel 390 is provided with a plurality of apertures 391 through which the spacer bars 222 and the bolts 221 may be passed, the apertures 391 comprising slots or at least being formed with sufficient clearance to permit the relative angular displacement between the spacer bars 222 and the inertia wheel 390.

A ball bearing 68 is seated in the recess 313 and is engaged by a movable bushing 69 having a seating recess 70 to receive the ball bearing 68, the movable bushing 69 being slidably supported in a centrally disposed bore 71 formed in a cover member 72 and being resiliently biased by a spring 73 confined within a spring housing 74 affixed to the cover 72.

In operation, an acceleration of the vehicle will result in the delivery of an unbalanced torque to the inertia wheel 390 as well as to the frame support which includes the disk 220, the spacer bars 222 and the camming disk 310. The inertia wheel 390 is, however, connected to the drive shaft 190 by means of the torsion-responsive shaft 193 and has a comparatively much greater inertia resistance than the combined elements driven directly off of the drive shaft 190, hence, the structure of Figure 4 exemplifies the driving of two rotatable objects of varying moments of inertia simultaneously with the same unbalanced torque.

A relative angular displacement will occur, therefore, between the inertia wheel 390 and the drive shaft 190 or more particularly between the bearing portion 192 of the drive shaft 190 and the camming disk 310 rigidly connected to the drive shaft 190. When such relative angular displacement occurs, the camming pin 430 will ride against the camming surface 312 of the hub 311 and will drive the camming disk 310 together with the spacing bar 222, the bolt 221 and the disk 220 upwardly against the bias of the coil spring 73.

A rod 76 passes through the coil spring 73 and is connected to the bushing 69 so as to transmit the linear movement of the bushing 69 to a flux core member 77 carried by the rod 76.

It may be noted that the transducer 100 is completely enclosed by a casing 260 disposed between the cover 72 and the frame 160 so as to preclude windage interferences with the rotatable mechanism associated with the drive shaft 190.

The flux core member 77 is actually part of a transducer which is adapted to measure a linear displacement electrically, the transducer being indicated generally by the reference numeral 23'.

The transducer 23' includes a pair of spaced apart generally C-shaped secondary cores 78 and 79 respectively having secondary windings 80 and 81 connected in series with one another and in series with the primary and output transformer.

A primary core 82 having a primary winding 83 thereon is disposed within an air gap 84 situated between the two secondary cores 78 and 79. An alternating current is passed through the primary winding 83.

As is well known to those versed in the art, when the flux core member 77 is moved in response to linear movement of the rod 76 resulting from the relative angular displacement between the inertia wheel 390 and the drive shaft 190 which will be proportional to the acceleration induced component of unbalanced force, an electrical signal voltage will be induced in the secondary windings 80 or 81 which will appear across the terminals T1 and T2.

Such signal is used to apply a counterbalancing force to the pendulously mounted disk pendulum in opposition to the acceleration induced components of force in any well known manner, for example, in the same manner as was described in connection with the embodiments of Figure 3. Because the circuit components of the arrangement shown in Figure 4 other than those contemplated in connection with the transducer 23' are identical with the circuit components shown in the arrangement of Figure 3, identical reference numerals have been employed for the sake of clarity.

It will be understood that the linear movement of the rod 76 may be converted into an electrical signal by means of other mechanisms. By way of illustrative example, reference may be had to the structural embodiments shown in Figure 6 wherein a camming disk 310' will move a bushing 69' through a ball bearing 68' against the bias of a coil spring 73' confined by a spring housing 74' carried on a cover 72' of a transducer so as to linearly displace a rod 76' having a link member 86 pivotally connected on the end thereof.

The link member 86 is associated with a mechano-electronic transducer indicated generally by the reference numeral 87 supported in a ring 88 firmly connected by a fastener 89 to a Z angle support 90 rigidly secured to the cover 72' by a fastener 91.

The mechano-electronic transducer 87 is a commercially available triode-type vacuum tube sold and manufactured by the Radio Corporation of America under the identification of RCA-5734 and comprises a triode transducer having a plate shaft 92 supported in the center of a thin metal diaphragm for displacement relative to a fixed grid 93 whereupon a change in plate current will be produced, the changes in such plate current being readily available for use as a signal current in generating a counterbalancing force to be applied to a pendulously mounted disk pendulum in opposition to the acceleration induced force components.

Although I have resorted to detail in the description of the principles of my invention for the sake of clarity, it should be understood that I wish to embody within the scope of this patent all such modifications as reasonably and properly come within the scope of my contribution to the art.

I claim as my invention:

1. In an apparatus for compensating a pendulously mounted object in a vehicle movable on a linear path against acceleration induced components of force, a rotatable driving means carried by the vehicle, means to translate linear movement of the vehicle into a proportional angular displacement of said rotatable driving means, a rotatable mass having a high moment of inertia, a torsionally flexible connection between said mass and said driving means to normally rotate said mass and said driving means at constant speed in predetermined angular alignment and responding to linear acceleration of the vehicle to temporarily angularly displace said driving means out of alignment with respect to said rotatable mass, and transducer means to measure the relative angular displacement between said rotatable mass and said driving means electrically and adapted to control a counterbalancing force to the pendulously mounted object in opposition to the acceleration induced components of force.

2. An apparatus for compensating a pendulously mounted object in a vehicle movable on a linear path against acceleration induced components of force which includes a rotatable driving means carried by the vehicle, means to translate linear movement of the vehicle into a proportional angular displacement of said rotatable driving means, a rotatable mass having a high moment of inertia, a torsionally flexible connection between said mass and said driving means flexing in response to linear acceleration of the vehicle to temporarily relatively angularly displace said driving means and said rotatable mass, and means to measure the difference in relative angular displacement between said driving means and said rotatable mass and adapted to control a counterbalancing force to the pendulously mounted object in opposition to the acceleration induced components of force in response to variations in the angular displacement between said driving means and said rotatable mass.

3. In an apparatus for compensating a pendulously mounted object in a vehicle movable on a linear path against acceleration induced components of force, a rotatable driving means carried by the vehicle, means to translate linear movement of the vehicle into a proportional angular displacement of said rotatable driving means, two rotatable masses each having a different moment of inertia, separate connecting means between each of said masses and said rotatable driving means, one of said connecting means for the mass having the largest moment of inertia being resiliently flexible to effect temporary angular displacement between said masses in response to linear accelerations of said vehicle, and transducer means to translate the difference in relative angular displacement between said two masses into an electrical signal adapted to control a counterbalancing force to the pendulously mounted object in opposition to the acceleration induced components of force in response to variations in said electrical signal.

4. An apparatus according to claim 3 in which the transducer means comprises a selsyn unit and electrical slip ring contact means, the rotor and the stator of the selsyn unit being separately mounted on each of said two rotatable masses.

5. An apparatus according to claim 3 in which the transducer means comprises a pair of secondary cores having secondary windings thereon with an air gap between said cores to receive a primary core having a primary winding thereon and a flux core member movable relative to said primary core and said secondary cores to vary the induced voltages produced in said secondary windings in response to variations in the positioning of said flux core member, and means to move the movable flux core member in response to movement of the masses.

6. An apparatus according to claim 3 in which the transducer means comprises a triode type vacuum tube including a cathode, a fixed grid and a movable plate and translation means between said rotatable masses and the movable plate to displace the movable plate relative to the grid in proportion to the relative angular displacement between said rotatable masses, whereby the plate current of said tube will vary in direct proportion to the component of linear acceleration.

7. In an apparatus for compensating a pendulously mounted object in a vehicle movable on a linear path against acceleration induced components of force, driving means including rotatable elements to translate the linear movement of the vehicle into an angular displacement of said rotatable elements, said rotatable elements including at least two separate elements each having a separate driving connection with said driving means and one of said elements having a predetermined larger moment of inertia than the other and its corresponding driving connection being resiliently flexible for effecting temporary angular displacement of said elements in response to linear acceleration of said vehicle, and transducer means between said two elements to measure the relative angular displacement between said elements as an electric signal proportional to the component of linear acceleration and adapted to control a counterbalancing force to said pendulously mounted object in opposition to the acceleration induced components of force.

8. An apparatus according to claim 7 in which the transducer means comprises a selsyn unit and electrical slip ring contact means, the stator and the rotor portions of the selsyn unit being mounted separately on each of said two rotatable elements and the induced voltage signal generated thereby being lifted through said slip ring contact means.

9. An apparatus according to claim 7 in which the transducer means includes a pair of spaced secondary cores having secondary windings thereon, a primary core disposed in an air gap between said secondary cores and having a primary winding thereon, a flux core movable relative to the primary core and the secondary core and translation means between said flux core and said rotatable elements to displace the flux core in proportion to the relative angular displacement between said rotatable elements, whereby the induced voltage signals generated by said secondary windings will vary in direct proportion to the component of linear acceleration.

10. An apparatus according to claim 7 in which the transducer comprises a triode-type vacuum tube including a cathode, a fixed grid and a movable plate and translation means between said rotatable elements and the movable plate to displace the movable plate relative to the grid in proportion to the relative angular displacement between said rotatable elements, whereby the plate current of said tube will vary in direct proportion to the component of linear acceleration.

11. In an apparatus for compensating a pendulously mounted object in a vehicle movable on a linear path against acceleration induced components of force, a rotatable driving means carried by the vehicle, means to translate linear movement of the vehicle into a proportional angular displacement of said rotatable driving means, a rotatable mass having a high moment of inertia, a torsionally flexible connection between said mass and said driving means effecting relative angular displacement of said mass and said driving means in response to the linear acceleration of the vehicle, transducer means to measure the relative angular displacement between said rotatable mass and said driving means electrically, and closure means to completely enclose said rotatable mass to preclude windage friction interference, whereby a counterbalancing force controlled by the transducer means may be applied to the pendulously mounted object in opposition to the acceleration induced components of force.

References Cited in the file of this patent

UNITED STATES PATENTS

| Number | Name | Date |
|---|---|---|
| 1,936,321 | Ambronn | Nov. 21, 1933 |
| 2,159,778 | Bush | May 23, 1939 |
| 2,193,910 | Wilson | Mar. 19, 1940 |
| 2,198,034 | Farmer | Apr. 23, 1940 |
| 2,272,601 | Eksergian | Feb. 10, 1942 |
| 2,362,616 | Cloud | Nov. 14, 1944 |
| 2,390,581 | Gille | Dec. 11, 1945 |
| 2,391,966 | Harrison | Jan. 1, 1946 |